April 14, 1931.  W. R. MITTENDORF  1,800,742
REGISTERING DEVICE
Filed Dec. 5, 1923   4 Sheets-Sheet 1
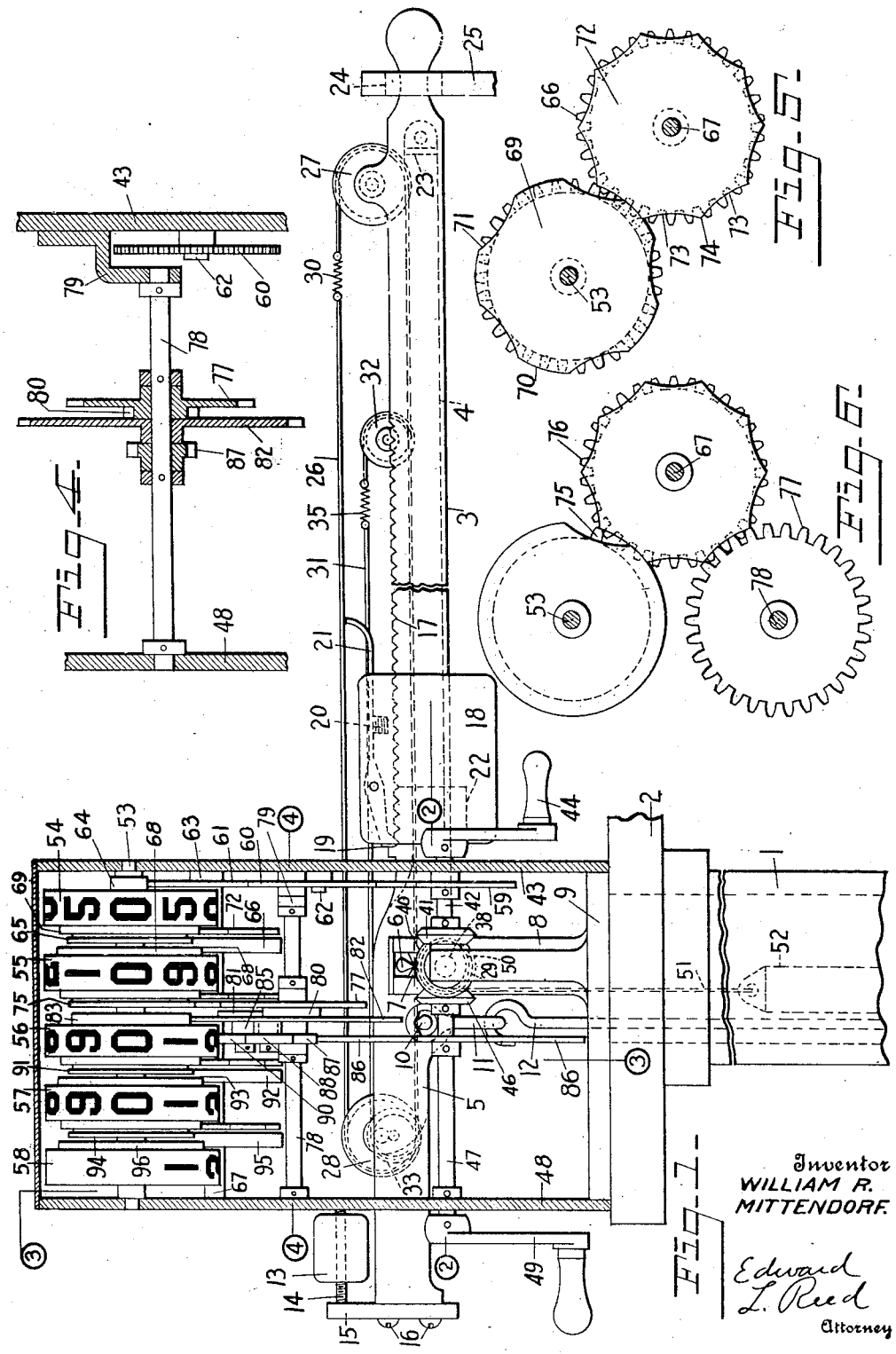
Inventor
WILLIAM R. MITTENDORF.
Edward L. Reed
Attorney

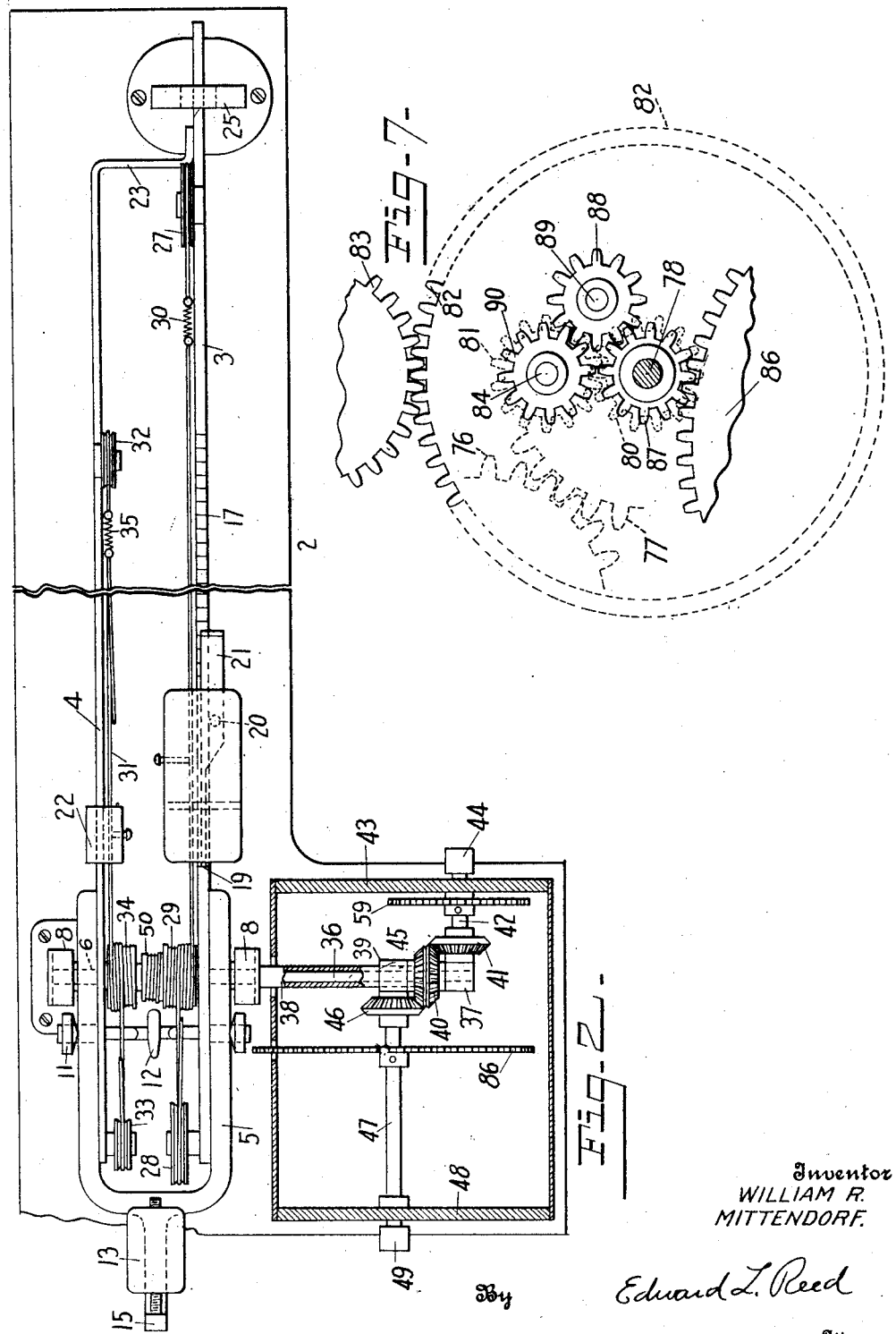

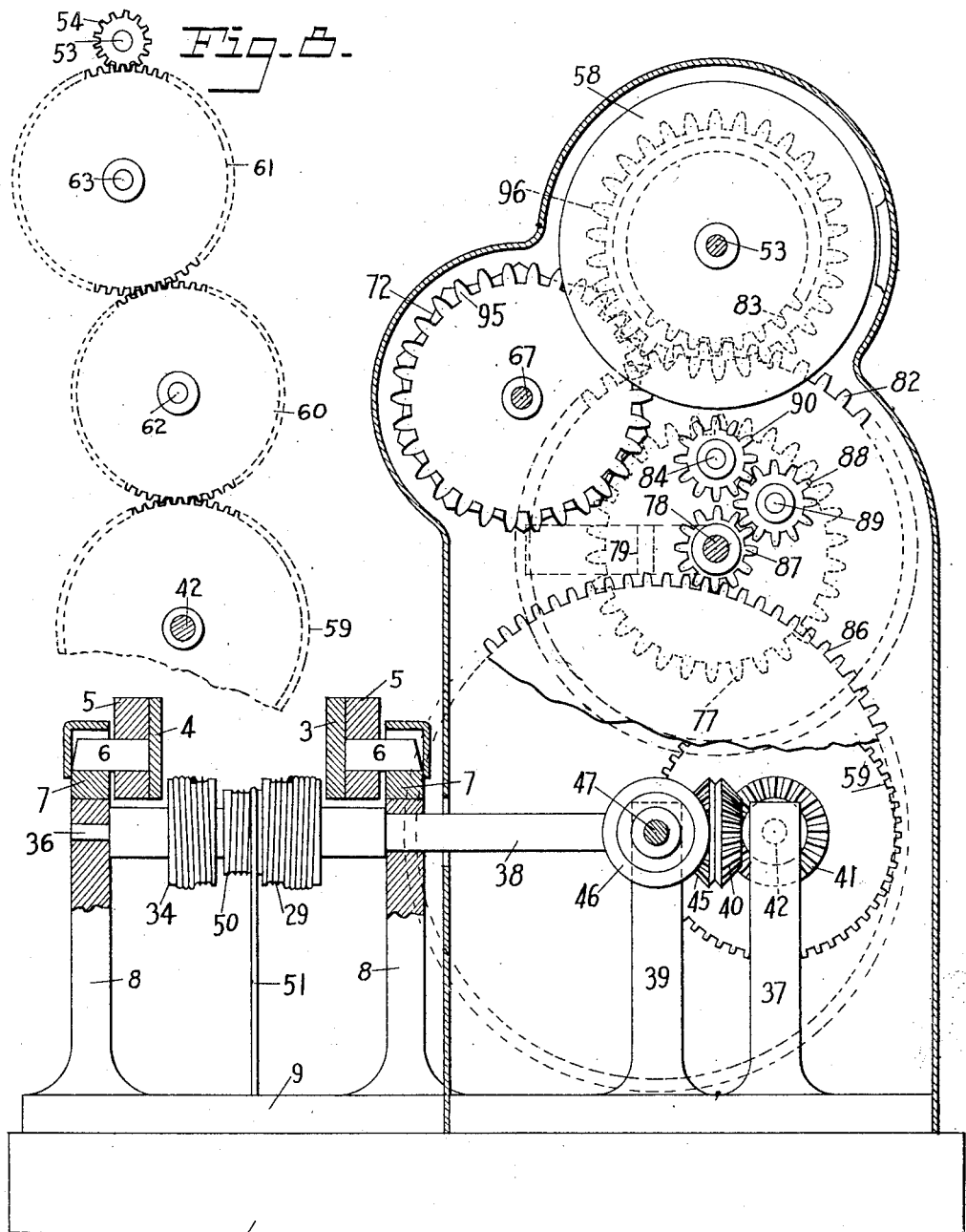

April 14, 1931.  W. R. MITTENDORF  1,800,742
REGISTERING DEVICE
Filed Dec. 5, 1923  4 Sheets-Sheet 4
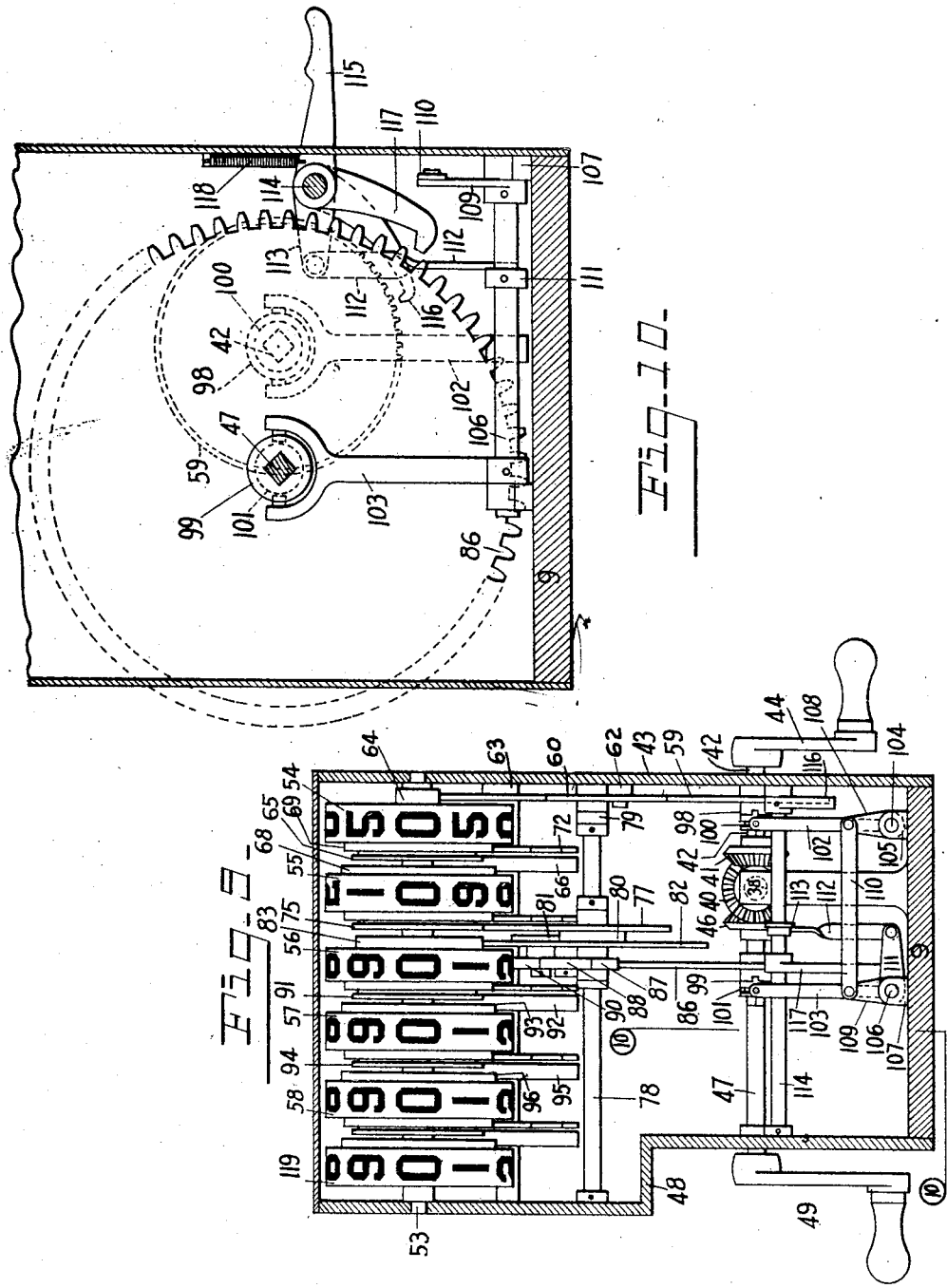
INVENTOR.
WILLIAM R. MITTENDORF.
BY Edward L. Reed
ATTORNEYS.

Patented Apr. 14, 1931

1,800,742

UNITED STATES PATENT OFFICE

WILLIAM R. MITTENDORF, OF CINCINNATI, OHIO, ASSIGNOR, BY MESNE ASSIGNMENTS, TO INTERNATIONAL BUSINESS MACHINES CORPORATION, OF NEW YORK, N. Y., A CORPORATION OF NEW YORK

REGISTERING DEVICE

Application filed December 5, 1923. Serial No. 678,616.

This invention relates to registering devices for scales and it is designed more particularly for use with beam scales.

One object of the invention is to provide a registering device which will accurately register the weight of the load on the platform as indicated by the position of the poise on the beam.

A further object of the invention is to provide, in connection with a scale having two beams with separate poises, a registering device which will register the total weight of the load as indicated by the positions of the two poises on the respective beams, that is, will compute and register the sums of the indications on the two beams.

A further object of the invention is to provide a registering device of this character which will be reversible so that the registration thereon will correspond at all times with the position or positions of the poise or poises.

A further object of the invention is to provide a registering device of this kind which will be independent of the beams themselves and may be mounted in various positions with relation thereto.

A further object of the invention is to provide a mechanism of this kind which will be simple in its construction, accurate in its operation and which can be produced at a relatively low cost.

Other objects of the invention will appear as the mechanism is described in detail.

In the accompanying drawings Fig. 1 is a front elevation of a mechanism embodying my invention, with the casing in section; Fig. 2 is a section taken on the line 2—2 of Fig. 1, showing the beams and their associated parts in plan; Fig. 3 is a section taken on the line 3—3 of Fig. 1; Fig. 4 is a detail section taken on the line 4—4 of Fig. 1; Fig. 5 is a detail view of the transfer gearing between the units counterwheel and the tens counterwheel; Fig. 6 is a detail view of a portion of the transfer mechanism between the tens counterwheel and the hundreds counterwheel; Fig. 7 is a side elevation of the planetary driving mechanism for the hundreds counterwheel; Fig. 8 is a detail view of the driving gearing for the units counterwheel; Fig. 9 is a front elevation of the register and its actuating devices showing addition of means for converting the indicating register into a totalizing register; and Fig. 10 is a section taken on the line 10—10 of Fig. 9.

In these drawings I have illustrated one embodiment of my invention and have shown the same in connection with a platform scale of a well known type but it will be understood that the invention may take various forms and that it may be applied to scales of various types.

The scale to which the invention is here applied comprises standards 1 extending upwardly from the base of the scale, one only of these standards being here shown. Mounted on the upper ends of the standards is a top plate or supporting member 2 on which the beam and its associated parts are mounted. The present scale is of the high capacity type and comprises two beams 3 and 4, which are rigidly connected one to the other and form in effect a double beam. These beams are rigidly secured at their inner ends to the respective parallel arms of a bifurcated lever 5. This lever is provided with knife edge pivots 6 which engage the usual V-bearings 7 carried by upright standards 8 mounted on a base 9 which in turn is supported by the top plate 2 of the scale structure. The lever 5 is also provided, on that side of its axis opposite the beams 3 and 4, with pivot pins 10 from which is suspended a stirrup 11 having connected therewith the usual draft rod 12 which extends downwardly through one of the uprights or standards 1 and is connected in any suitable manner with the load platform. The lever 5 is provided with the usual balance ball or weight 13 for regulating the gravity or the zero balance of the lever or weigh beam and, as here shown, it is adjustably mounted on a screw 14 carried by a plate 15 which is rigidly but adjustably mounted on the end of the lever 5, by means of screws 16. The beam 3 is of large capacity, in the present instance twenty thousand pounds, and is graduated in units of five hundred pounds each, each graduation being represented by a substantially V-shaped notch 17 formed in the upper edge of the beam. A poise 18 is mounted on the beam 3 for movement lengthwise thereof. Because of the large value of each graduation of the beam it is essential that the poise should be accurately positioned with relation to these graduations and I have therefore provided the poise with a detent or alining pawl 19 having a V-shaped nose adapted to enter the several recesses 17 and to accurately position the poise with relation thereto. A spring 20 acts on the pawl to force the nose thereof firmly into the recess and to thus accurately aline the poise with the recess or graduation. Preferably the notches or graduations 17 are so shaped that while the pawl will ride out of a recess when the poise is moved outward it will not ride out of the recess when the poise is moved inwardly or toward its zero position. To this end the inner wall of each recess is arranged at a relatively sharp angle to the length of the beam while the forward or outer wall of the recess is formed at a broader angle. It is therefore necessary to positively actuate the pawl 19 to release the poise for return movement and for this purpose the pawl is provided with a finger piece 21 by means of which the spring 20 may be compressed and the pawl moved into an inoperative position.

The beam 4 is of relatively small capacity, in the present instance five hundred pounds, and is provided with a poise 22 which moves along the same. In the present construction the outer end of the beam 4 is bent over, as shown at 23, and rigidly connected with the beam 3 near the outer end thereof for the purpose of imparting rigidity to the beams and avoiding vibration thereof. The end of the beam 3 extends beyond its point of connection with the beam 4 and through an opening 24 in the standard 25 which may be mounted on the top plate 2 or any suitable support, and the upper and lower walls of this opening constitute the stops which limit the movement of the two beams. The beam 4 may, if desired, be provided with suitable graduations, preferably in units of five pounds each, but inasmuch as a separate indicator is provided such graduations are not essential.

Suitable means are provided for mechanically shifting the poises along the respective beams and this means, as here shown, is similar to that shown and described in the application for patent filed by me October 17, 1923, Serial No. 669,135. The mechanical shifting mechanism for the main poise 18, of the large capacity beam 3, comprises an endless cable 26 which is firmly secured to the poise 18 and extends about a pulley 27 mounted on the beam near the outer end thereof and about a pulley 28 mounted on the lever 5 on that side of the axis of the lever opposite the beam. The lower stretch of the cable 26, between the pulley 28 and the poise, is passed about a drum 29 which may be provided with spiral grooves to receive the cable and about which the cable is wound several times and to which it is preferably anchored. The ends of the cable are connected by a spring 30 which holds the same taut without in any way interfering with its movement. Likewise the poise 22 for the low capacity beam 4 is secured to a cable 31 which extends about a pulley 32 mounted on the beam near the outer end thereof and about a pulley 33 mounted on the lever 5 on the opposite side of the axis of the beam. This cable is wound about and anchored to a drum 34 similar to the drum 29 and arranged co-axially therewith. The ends of this cable are also connected one to the other by a spring 35. The two drums 29 and 34 are so arranged with relation to the axis of the beams that the points of tangential contact of the cables with the respective drums will be coincident with the axis of the beams. Consequently the cables will not in any way interfere with or influence the free movemnt of the beams about their common axis. In the present construction the drum 34 is rigidly secured to a shaft 36, journaled at its outer end in one of the standards 8 and at its inner end in an upright standard 37 carried by the base 9. The drum 29 is rigidly secured to a hollow shaft or sleeve 38 which is rotatably mounted on the shaft 36 and is journaled in the inner standard 8 and in a standard 39 extending upwardly from the base 9. The shaft 36 has secured thereto a beveled gear 40 which meshes with a beveled gear 41 secured to a shaft 42 which, in the present instance, extends at right angles to the shaft 36 and is journaled at its inner end in the standard 37 and at its outer end in a frame member 43, which in the present device, constitutes one of the side walls of the casing which encloses the indicator operating mechanism. On the outer side of the frame member or side wall 43 the shaft 42 is provided with an operating handle or crank 44 by means of which it may be rotated and rotation thus imparted to the drum 34 to shift the poise on the small capacity beam 4. It will be obvious that the device may be operated to move the poise in either direction. The hollow shaft or sleeve 38 has secured thereto a beveled gear 45 which meshes with a corresponding beveled gear 46 secured to a shaft 47, also extending at right angles to the shaft 38 and journaled at its inner end in the standard 39 and near its outer end in a second frame member or casing wall 48. This shaft is also provided on the outer side of the frame member or casing wall with an operating handle or crank 49 by means of which it may be actuated to impart rotatory movement to the drum 29 and thereby shift the main poise 18 on the high capacity beam 3 in either direction.

It is customary in scales of this type to rely upon the pressure of the spring 20 on the alining or index pawl 19 to properly seat this pawl in the recess but to insure a more positive action and an absolutely accurate positioning of the poise I have provided means whereby when the operating mechanism is released the pawl will be positively moved against the inner or rear wall of that recess with which it is in engagement. To this end I have connected a drum 50 with the hollow shaft 38 which carries the drum 29 for shifting the poise 18 and have secured to this drum and wound about the same a cable 51 to the lower end of which is connected a weight 52 which tends to rotate the drums 50 and 29 in a direction to move the pawl rearwardly and which therefore holds the nose of the alining pawl 19 in contact with the rear wall of the recess.

In connection with the scale mechanism above described I have provided a registering device which may be either in the form of a visual indicator or of a record printing device. In either instance it registers the weight indicated by the positions of the poises on the beams. When in the form of an indicator it enables this registration or computation to be read from a point a considerable distance from the beam and, further, the registering device or indicator may be mounted at a point more or less remote from the beam, or so arranged as to be read from the rear of the beam, as, for example, by the driver of a wagon standing on the load platform. This registering device may take various forms but preferably comprises a plurality of registering or indicating members, the movements of which are so controlled by the movements of the poises that these indicating members will always be in a position to indicate the exact weight represented by the positions of the poises on the beams. In the present instance, the registering device comprises a visual indicator consisting of a plurality of counterwheels arranged in axial alinement and journaled on a shaft 53, mounted in the frame members 43 and 48, the several counterwheels being independently rotatable on this shaft. Inasmuch as the capacity of the present scale is 20,500 pounds I have provided the present registering device with five counterwheels, these consisting of a units counterwheel 54, a tens counterwheel 55, a hundreds counterwheel 56, a thousands counterwheel 57 and a ten thousands counterwheel 58. The total registering capacity of the units and tens counterwheels being less than a single unit or graduation on the large capacity beam 3 it is unnecessary that these counterwheels should be affected by the position of the poise 18 and they are controlled solely by the movement of the poise 22 on the low capacity beam 4. An operative connection may be established between the poise 22 and the units counterwheel in any suitable manner but I prefer to establish this connection through the operating mechanism by means of which the poise is shifted along the beam. To this end I have mounted on the shaft 42 a gear 59 which is connected, through idle gears 60 and 61 mounted, respectively, on studs 62 and 63, with a pinion 64 rigidly secured to the units counterwheel 54. Thus upon each movement of the poise 22 a corresponding movement will be imparted to the units counterwheel. The low capacity beam 4 is graduated in units of five pounds each and I therefore prefer that the units counterwheel should register in units of five. This counterwheel is a ten point wheel and I have here shown it as provided with five ciphers and five numerals 5 arranged alternately upon the periphery thereof so that the numeral 5 and the cipher will be moved alternately into reading position. The tens counterwheel 55 is also a ten point wheel and is provided on its periphery with the numerals 0 to 9 inclusive. Interposed between the units counterwheel and the tens counterwheel is suitable transfer mechanism which will cause the tens counterwheel to be advanced one point for each two points of advancement of the units counterwheel, that is, each time a total of ten pounds is added to the units counterwheel this amount will be transferred to the tens counterwheel. This transfer mechanism may take any suitable form but, as here shown, it comprises a five toothed star wheel 65 rigidly secured to the units counterwheel and meshing with a transfer gear 66 mounted upon a shaft 67, which is supported at its ends in the frame members 43 and 48, and which also meshes with a driving gear 68 rigidly secured to the tens counterwheel. There being five teeth in the star wheel it will be apparent that the tens counterwheel will be advanced five times for each complete rotation of the units counterwheel or, in other words, that the units counterwheel will make two complete rotations for each full rotation of the tens counterwheel. To lock the transfer gear 66 against movement when the star wheel is out of engagement therewith I have secured to the units counterwheel 54 a locking disk 69 having five concentric peripheral portions 70 separated one from the other by recesses 71, these recesses being arranged adjacent to the respective teeth of the star wheel. Rigidly secured to the transfer gear 66 is a second locking disk 72 having in its periphery ten recesses 73 separated by points or teeth 74 and adapted to receive the concentric portions of the disk 69. So long as one of the concentric portions of the disk 69 lies in one of the recesses 73 the disk 72 and the transfer gear 66 are locked against movement. When the rotation of the counterwheel moves the concentric portion of the disk 69 out of the recess 73, in which it lies, a tooth of the star wheel will engage the transfer gear and impart rotation thereto, this rotation being permitted by the fact that one of the points 74 of the disk 72 will enter the succeeding recess 71 in the disk 69. As the tooth of the star wheel clears the transfer gear a succeeding concentric portion of the disk 69 will enter a succeeding recess in the disk 72 and the parts will again be locked against movement.

The capacity of the beam 4 being five hundred pounds it is necessary that the hundreds counterwheel 56 should be under control of the poise 22 on the beam 4. Further, the unit of graduation on the large capacity beam 3 being less than the capacity of the hundreds counterwheel it is also necessary that that counterwheel should be under the control of the poise 18 on the beam 3. I have therefore provided a special driving mechanism which may be operated either from the tens counterwheel 55 or from the operating device for the poise 18 to advance the hundreds counterwheel. Preferably this driving mechanism is of the planetary type and is connected with the transfer mechanism for the tens counterwheel and with the shaft 47 of the operating mechanism for the poise 18 through different trains of gearing, so as to cause the movement of the hundreds counterwheel to correspond to the movement of the particular part from which it is driven. The transfer mechanism for the tens counterwheel is similar to that for the units counterwheel but comprises a one tooth gear 75 instead of a five tooth gear and this one tooth gear meshes with a transfer gear 76 on the shaft 67 but the transfer gear instead of meshing directly with the driving gear for the hundreds counterwheel meshes with a gear 77 journaled on a shaft 78 which is supported at one end in the side frame member 48 and at the other end in a bracket 79 on the frame member 43. Rigidly secured to the gear 77 is a pinion 80 which meshes with a pinion 81 carried by a large gear 82 which is rotatably mounted on the shaft 78 and which meshes with a driving gear 83 rigidly connected with the hundreds counterwheel. Preferably the pinion 81 is mounted on a shaft 84 journaled in a bearing 85 carried by the body of the gear 82. Rigidly secured to the shaft 47 of the operating mechanism for the main poise 18 is a gear 86 which meshes with a pinion 87 journaled on the shaft 78 and meshing with an idle pinion 88, mounted on a stud 89 carried by the gear 82, which pinion in turn meshes with a pinion 90 rigidly secured to the shaft 84 to which the pinion 81 is secured. When the operating shaft 47 is stationary the gear 86 will hold the pinion 87 against rotation on the shaft 78 and when the transfer gear 76 rotates the gear 77 and the pinion 80 the action of the pinion 80 on the pinion 81 will cause that pinion to travel about the pinion 80, thus imparting rotary movement to the large gear 82 which movement is transmitted through the driving gear 83 to the hundreds counterwheel 56, the ratio of the gearing being such that the hundreds counterwheel will be advanced one point upon each operation of the transfer mechanism, that is, upon each complete rotation of the tens counterwheel. When the transfer mechanism is stationary the pinion 80 will be held against rotation on the shaft 78 and the operation of the shaft 47 of the operating mechanism will cause the gear 86 to rotate the gear 87 and the action of the pinion 87 on the pinion 90 is such as to cause that pinion to travel about the pinion 87 and thereby impart rotatory movement to the gear 82 which is transmitted to the hundreds counterwheel, the ratio of the gearing being such as to cause the hundreds counterwheel to be advanced five points for each graduation over which the poise 18 is moved. The count is transferred from the hundreds counterwheel to the thousands counterwheel by a one toothed transfer gear 91 which meshes with a transfer gear 92 which also meshes with a driving gear 93 on the thousands counterwheel. Likewise the thousands counterwheel is provided with a one toothed gear 94 which meshes with a transfer gear 95 which also meshes with a driving gear 96 for the ten thousands counterwheel 58. Locking devices similar to that above described are provided to hold the transfer gears 92 and 95 normally against movement.

It will be apparent therefore that each movement of either poise is transmitted to the registering device and that the registering device and its operating mechanism are reversible so that they will be so operated by the movement of the poises in either direction as to cause the registration to at all times agree with the positions of the poises. Because of the common control of the hundreds counterwheel the registration is accurately effected and will represent the sum of the weights indicated by the poises on the two beams. For example, when a load is placed upon the platform the operating handle 49 will be actuated to cause the poise 18 to move outwardly until the beam 3 is balanced or overbalanced and moved downwardly. If the beam is overbalanced the poise will be moved rearwardly by the weight 52, as soon as the handle 49 is released, and the detent 19 will thus be caused to engage the notch or graduation 17 next preceding the overbalacing position of the poise, which we will assume to be 15,500 pounds. The handle 44 is then actuated to move the poise 22 outwardly on the small capacity beam 4 until the beam is balanced, at which time we may assume that the poise is in line with the graduation representing 275 pounds. The adjustment of the poise 18 will have acted on the hundreds counterwheel through the driving mechanism to cause the three highest counterwheels to be adjusted to set up the amount 15,500. The adjustment of the poise 22 will act upon the first three counterwheels to set up thereon the amount 275, the 200 being transferred from the tens counterwheel to the hundreds counterwheel through the planetary driving mechanism, whereby the total registration will be 15,775. When the weighing operation has been completed and a reading taken, the handle 44 is operated in a reverse direction to restore the poise 22 to a zero position and the finger piece 21 for the detent pawl 19 on the poise 18 is actuated to release that poise, which will then be returned to its zero position by the weight 52. Upon the return movement of both poises the counterwheels are actuated in a reverse direction to restore them to zero. It may be here noted that because of the arrangement of the planetary driving gearing the hundreds counterwheel is rotated in a direction the reverse of that in which the units and tens counterwheels are rotated and for this reason the numerals on the peripheries of the hundreds, thousands and ten thousands counterwheels run in the opposite direction from that of the units and tens counterwheels. The figures on the counterwheels being of relatively large size can be read either by the operator or anyone else in the vicinity at a considerable distance from the beam, thus avoiding the necessity of closely examining the beam to take the reading therefrom and, further, the registration indicated is the computed sum of the indications on the two beams, thereby avoiding the necessity of the operator or other reader adding these two items with the consequent likelihood of error. It will be noted that the registering or indicating mechanism is wholly independent from the weighing mechanism and is connected therewith only through the medium of the driving connections. Therefore, instead of mounting these registering devices upon the same frame upon which the operating mechanism for the poises is mounted it may be separately mounted at a point more or less remote from the beams, the only change in the mechanism necessary to permit of this arrangement being the extension of the gear trains or the interposition therein of elongated connections, such as shafts, sprocket chains or the like. In this manner the indicator may be so arranged that it can be read by a person outside of the room in which the beams are located.

The registering or adding device, when operated as above described, will compute the weights or values as determined by the positions of the poises on the respective beams and will also compute the total weight or value as determined by the positions of the two poises on their beams. With the mechanism described the registering or adding device computes the weight or value as to a single load and the registration is destroyed when the poises are returned to their zero or initial positions. It may, under some circumstances, be desirable to compute the total weight or value of several successive loads placed upon the scale and this can be accomplished by merely adding to the mechanism already described means for rendering the connections between the poises and the registering or computing devices inoperative while the poises are being returned to their zero or initial positions, and without other modification of the mechanism. In Figs. 9 and 10, I have shown the registering device with its actuating mechanism provided with means for interrupting the connections between the actuating devices and the registering means. To accomplish this I have mounted the gears 59 and 86 loosely upon their respective shafts, 42 and 47, and have provided the hub of each gear in one end with notches so that they will constitute clutch members. Cooperating clutch members 98 and 99 are slidably mounted on the respective shafts 42 and 47 and are held against rotation relatively thereto so that when these clutch members are inoperative engagement with the clutch members connected with the respective gears the latter will be driven by the respective actuating shafts but when these clutch members are disconnected from the gears the shafts will rotate relatively to the gears without affecting the registering mechanism. The slidable clutch members may be operated in any suitable manner but preferably means are provided for actuating the same simultaneously. Inasmuch as it is frequently necessary to move the poises back and forth along the respective beams in balancing the scale and these movements should be transmitted to the registering device I prefer not to control the clutches by the reverse movement of the operating shafts 42 and 47 and have provided a single manually operated device for shifting the clutches. As here shown, each clutch member 98 and 99 is provided with a peripheral groove, 100 and 101, to receive the pins carried by the yokes of shipper arms 102 and 103, of well known construction. The shipper arm 102 is rigidly secured to a shaft 104 mounted in bearings 105 on the base plate 9 and the shipper arm 103 is rigidly secured to a shaft 106 mounted in bearings 107 on the base plate 9. These shafts are provided with upwardly extending crank arms, 108 and 109, which are connected one to the other by a link 110 so as to cause the two shafts, and consequently the two shipper arms, to move in unison. One of the shafts, in the present instance the shaft 106, has rigidly secured thereto a second crank arm 111 which is connected by means of a link 112 with the inner end of a lever 113 which is rigidly secured to a shaft 114 journaled in the side walls 43 and 48 of the casing. The outer end of this lever projects beyond the front wall of the casing, as shown at 115, and is provided with a finger piece by means of which it may be manipulated to impart movement to the shipper arms and thus actuate the two clutches. In order to positively lock the registering device against movement, so as to prevent the accidental displacement of the counterwheels while the clutches are disconnected, I have rigidly secured to the shaft 114 which carries the lever 115 dogs 116 and 117 adapted, respectively, to engage the teeth of the gear 59 and the gear 86 when the actuating lever 113 has been depressed to move the clutches into their inoperative positions, thereby rigidly locking these gears and consequently the registering device against movement. If desired, a spring may be utilized to automatically restore the clutches to their operative positions and to normally retain them in those positions and, as here shown, a spring 118 is connected at one end with the outer portion of the lever 113 and at its upper end with the front wall of the casing above the lever. It will be apparent that by the addition of the clutches and their controlling devices I am enabled to control the registering or adding device in the same manner as heretofore described, that is, the counterwheels will be moved in accordance with the movement of the poises when the latter are moved in either direction but when the weight or value of a load has been determined and it is desired to restore the poises to their initial positions without destroying the registration on the adding device the finger piece 15 of the operating lever is depressed, thereby actuating the clutches to disconnect the actuating devices from the register and to lock the register against movement, thereby permitting the poise 18 to be restored to its initial position by the weight 52, when the dog 19 has been disengaged from the notches in the beam, and permitting the poise 22 to be restored to its initial position by the reverse movement of the handle 44. The registering mechanism itself has not been changed, with the exception that I have added thereto one additional counterwheel 119 so as to increase the capacity thereof.

While I have shown and described one embodiment of my invention I wish it to be understood that I do not desire to be limited to the details thereof as various modifications may appear to a person skilled in the art.

Having now fully described my invention, what I claim as new and desired to secure by Letters Patent, is:

1. In a weighing mechanism comprising a beam and a poise movable thereon, an actuating device comprising a rotatable member and a flexible member connected with said poise and with said rotatable member and having operative contact with said rotatable member at a point in line with the axis of said beam, a registering device supported independently of said actuating device, and an operative connection between said actuating device and said registering device.

2. In a weighing mechanism comprising a beam and a poise movable thereon, an actuating device comprising a rotatable member and a flexible member connected with said poise and with said rotatable member and having operative contact with said rotatable member at a point in line with the axis of said beam, a registering device supported independently of said actuating device, and a geared connection between said actuating device and said registering device.

3. In a weighing mechanism comprising a beam and a poise movable on said beam, an actuating device comprising a rotatable member and a flexible member connected with both said poise and said beam and connected with said rotatable member and having operative contact with said rotatable member at a point in line with the axis of said beam, a registering device supported independently of said actuating device, and an operative connection between said actuating device and said registering device.

4. In a weighing mechanism having a beam and a poise movable thereon, guides supported by said beam on opposite sides of its axis, a drum mounted adjacent to said axis, an endless cable wound about said drum, extending about said guides and connected with said poise, the point of tangential contact between said cable and said drum being coincident with said axis, means for actuating said drum, a registering device, and an operative connection between said registering device and the actuating means for said drum.

5. In a weighing mechanism having a beam and a poise movable thereon, guides supported by said beam on opposite sides of its axis, a drum mounted adjacent to said axis, an endless cable wound about said drum and extending about said guides and connected with said poise, the point of tangential contact between said cable and said drum being coincident with said axis, actuating means for said drum comprising a shaft and an operating handle, a registering device, and a driving connection between said shaft and said registering device.

6. In a weighing mechanism having a beam and a poise movable thereon, guides supported by said beam on opposite sides of its axis, a drum mounted adjacent to said axis, an endless cable wound about said drum, extending about said guides and connected with said poise, the point of tangential contact between said cable and said drum being coincident with said axis, actuating means for said drum comprising a shaft and an operating handle, a registering device comprising a plurality of counterwheels arranged in axial alinement, driving connection between said shaft and one of said counterwheels, and means for transferring the count from the first mentioned counterwheel to the other counterwheels.

7. In a weighing mechanism having two beams with separate poises movable on the respective beams, means for actuating said poises, a registering device mounted independently of said beams and said actuating means, and means controlled in accordance with the movement of said poises to cause said registering device to register the total weight indicated by the positions of the two poises on the respective beams.

8. In a weighing mechanism having two beams with separate poises movable on the respective beams, separate actuating devices for the respective poises, a registering device mounted independently of said beams and said poise actuating devices, and means controlled jointly by the actuating devices for the two poises for operating said registering device.

9. In a weighing mechanism having two beams of different capacities and separate poises movable on the respective beams, separate actuating devices for the respective poises, a registering device mounted independently of said beams and said poise actuating devices, and comprising a plurality of registering elements of successively increasing denominations, means controlled by the operating device for the poise on the beam of lower capacity for actuating a registering element of lower denomination, and means controlled by the operating device for the poise on the beam of larger capacity for operating a registering element of higher denomination.

10. In a weighing mechanism having two beams of different capacities and separate poises movable on the respective beams, separate actuating devices for the respective poises, a registering device comprising a plurality of registering elements of successively increasing denominations, means controlled by the operating device for the poises on the beam of lower capacity for actuating a registering element of lower denomination, means controlled by the operating device for the poise on the beam of larger capacity for operating a registering element of higher denomination, and means common to both of said operating devices for operating one of said registering elements.

11. In a weighing mechanism having two beams and separate poises movable on the respective beams, a registering device mounted independently of said beams to register the total of the items indicated by the two poises and comprising a plurality of registering elements, means for actuating one of said registering elements in accordance with the movement of one of said poises relative to its beam, and means for actuating another of said registering elements in accordance with the movement of the other of said poises relative to its beam.

12. In a weighing mechanism having two beams and separate poises movable on the respective beams, means for actuating said poises, a registering device supported independently of said actuating means and comprising a plurality of registering elements, means for actuating one of said registering elements in accordance with the movement of the poise on one of said beams, and means for actuating another of said registering elements in accordance with the movement of the poise on either of said beams.

13. In a scale having two beams and separate poises movable on the respective beams, a registering device comprising a plurality of registering elements, driving mechanism for actuating one of said registering elements in accordance with the movement of the poise for one of said beams, and driving mechanism for actuating another of said registering elements in accordance with the movement of the poises for both of said beams.

14. In a weighing mechanism having two beams and separate poises movable on the respective beams, a registering device comprising a plurality of registering elements, means for actuating the initial registering element proportionately to the movement of the poise for one of said beams, and means for actuating a succeeding registering element either from the first mentioned registering element or proportionately to the movement of the poise on the other of said beams.

15. In a scale having a beam of large capacity and a beam of small capacity and separate poises movable on the respective beams, a registering device comprising a plurality of registering elements, means for actuating the registering element of lowest denomination proportionately to the movement of the poise on the beam of small capacity, and means for actuating a registering element of higher denomination either from the first mentioned registering element or proportionately to the movement of the poise on the beam of larger capacity.

16. In a weighing mechanism having beams and separate poises movable on the respective beams, a registering device comprising a plurality of registering elements, means for actuating the registering element of lowest denomination in accordance with the movement of the poise on one of said beams, driving mechanism for a registering element of higher denomination comprising planetary gearing, means for actuating said planetary gearing from the first mentioned registering element, and means for actuating said planetary gearing in accordance with the movement of the poise on another of said beams.

17. In a weighing mechanism having two beams and separate poises movable on the respective beams, a registering device comprising a plurality of counterwheels mounted for rotation about a common axis, means for actuating the counterwheel of lowest denomination in accordance with the movement of the poise on one of said beams, means for transferring the count of each counterwheel to the next succeeding counterwheel, means for actuating a counterwheel of higher denomination independently of the counterwheels of lower denomination and in accordance with the movement of the poise on the other of said beams.

18. In a weighing mechanism having two beams and separate poises movable on the respective beams, a registering device comprising a plurality of counterwheels each having a driving gear, an actuating device for one of said poises having geared connection with one of said counterwheels, planetary gearing connected with the driving gear for another of said counterwheels, an actuating device for the other of said poises having operative connection with said planetary gearing, and an operative connection between said planetary gearing and a counterwheel of lower denomination.

19. In a weighing mechanism having two beams and separate poises movable on the respective beams, actuating devices for the respective poises, a registering device comprising a plurality of counterwheels, a driving connection between the actuating device for one of said poises and one of said counterwheels, a gear having driving connection with another of said counterwheels, pinions independently rotatable about the axis of said gear on opposite sides thereof, other pinions rotatably mounted in the body of said gear on opposite sides thereof, connected one with the other and meshing with the respective first mentioned pinions, means for rotating one of said first mentioned pinions from a counterwheel of lower denomination, and means for actuating the other of said first mentioned pinions from the actuating device for the other of said poises.

20. In a weighing mechanism having two beams and separate poises movable on the respective beams, actuating devices for the respective poises, a registering device comprising a plurality of counterwheels mounted for independent rotation about a common axis and each having a driving gear, a driving connection between the actuating device for one of said poises and the driving gear of the units counterwheel, means for transfering the count from the units counterwheel to the tens counterwheel, a gear meshing with the driving gear of the hundreds counterwheel, pinions arranged on opposite sides of said gear and independently rotatable about the axis thereof, a gear connected with one of said pinions, transfer mechanism connecting said tens counterwheel with the last mentioned gear, a gear connected with the actuating device for the other of said poises and meshing with the other of said pinions, and other pinions rotatably mounted on the opposite sides of the first mentioned gear, rigidly connected one with the other and having driving connections with the respective first mentioned pinions.

21. In a weighing mechanism having two beams and separate poises movable on the respective beams separate actuating devices for the respective poises, the actuating device for each poise comprising guides mounted on the beam on opposite sides of its axis, a drum mounted independently of said beam adjacent to the axis thereof, an endless cable wound about said drum, extending about said guides and connected with the poise, a shaft for rotating said drum, a registering device comprising a plurality of counterwheels, a gear connected with the shaft of one of said actuating devices and having driving connection with one of said counterwheels, a gear connected with the shaft of the actuating device for the other of said poises and having driving connection with another of said counterwheels, and means for actuating the last mentioned counterwheel from the first mentioned counterwheel.

22. In a weighing mechanism comprising a beam having a series of notches in one edge thereof representing the graduations of said beam, a poise slidably mounted on said beam, a pawl carried by said poise and adapted to enter the successive recesses in said beam, said recesses being so shaped with relation to the shape of said pawl that when pressure is applied to said poise in one direction, said pawl will ride out of its recess but when pressure is applied to said poise in the opposite direction it will be held against movement, means connected with said poise to exert a constant pull thereon in the last mentioned direction, an actuating device for moving said poise in one direction means for disengaging said pawl from its recess to permit said poise to be moved in the opposite direction, a registering device, and means for actuating said registering device from the actuating device for said poise.

23. In a weighing mechanism comprising a beam having notches in one edge thereof representing the graduations of said beam, a poise mounted on said beam, a detent carried by said poise and arranged to enter said notches and to hold said poise against movement toward a zero position, an actuating device for said poise comprising an endless cable, a drum about which said endless cable is wound, means for rotating said drum, a second drum connected with the first mentioned drum, a cable wound on said second drum, a weight carried by said cable and tending to actuate said drums in a direction to move said poise toward its zero position, means for actuating said detent to release said poise for movement toward its zero position, a registering device, and means having operative connection with said first mentioned drum for actuating said registering device.

24. In a scale, two beams, separate poises movable along the respective beams, means for actuating said poises, and a device mounted independently of said beams and said actuating means and controlled in accordance with the combined movement of said poises to register the total weight as determined by the positions of the two poises on the respective beams.

25. In a scale, two beams, separate poises movable along the respective beams, means for actuating said poises, and a device mounted independently of said beams and said actuating means and controlled in accordance with the combined movements of said poises to register the total value determined by the positions of the two poises on the respective beams.

26. In a scale, a plurality of beams and separate poises movable along the respective beams, means for actuating said poises, and a device mounted independently of said beams and said actuating means and associated with said poises to register the total value determined by the positions of the poises on the beams.

27. In a scale, a plurality of beams and separate poises movable along the respective beams, means for actuating said poises, and a single registering device mounted independently of said beams and said actuating means to register the relative value of the said poises as determined by their positions on the beams.

28. In a scale, a plurality of beams and separate poises movable along the respective beams, means for actuating said poises, a registering device mounted independently of said beams and said actuating means, and means operatively connected with said poises to actuate said device in accordance with the relative value of the said poises as determined by their positions on the beams.

29. In a scale, two beams and separate poises movable along the respective beams, means for actuating said poises, a registering device mounted independently of said beams and said actuating means, and means operatively connected with said poises to cause said device to register a value significant of the positions of the two poises on the respective beams.

30. In a scale, two beams and separate poises movable along the respective beams, means for actuating said poises, a computing device mounted independently of said beams and said actuating means, and means operatively connected with said poises to cause said device to compute a value significant of the positions of the two poises on the respective beams.

31. In a scale, a plurality of beams and separate poises movable along the respective beams, means for actuating said poises, an adding device mounted independently of said beams and said actuating means, and means to actuate said device in proportion to the total movements of the several poises along their respective beams.

32. In a scale, a plurality of beams and separate poises movable along the respective beams, means for actuating said poises, and an adding device mounted independently of said beams and said actuating means and operatively connected with all of said poises, whereby is established the sum of the values of the different poises as determined by their positions on the respective beams.

33. In a scale, a plurality of beams and separate poises movable along the respective beams, means for actuating said poises, and an adding device mounted independently of said beams and said actuating means and operatively connected with all of said poises, the movement of said poises serving to actuate said device so as to establish therein the value of the different poises as determined by their positions on the respective beams.

34. In a weighing mechanism comprising a beam and a poise movable along said beam, a registering device mounted independently of said beam, means to actuate said registering device in either direction in accordance with the movement of said poise on said beam, and means for rendering said actuating means inoperative while the poise is being restored to its initial position.

35. In a weighing mechanism comprising a beam and a poise movable along said said beam, a registering device mounted independently of said beam, a normally operative connection between said poise and said registering device to cause the same to move in unison in either direction, and means to interrupt said connection.

36. In a weighing mechanism comprising a beam, a poise movable along said beam, a registering device supported independently of said beam, a connection between said poise and said registering device to cause the registering device to be actuated by the movement of said poise in either direction, and means under the control of the operator for interrupting said connection.

37. In a weighing mechanism comprising a beam and a poise movable along said beam, means to actuate said poise, a registering device supported independently of said beam and operatively connected with said actuating means, and means for rendering said connection inoperative.

38. In a weighing mechanism comprising a beam and a poise movable along said beam, means to actuate said poise, a registering device operatively connected with said actuating means, and a clutch interposed in said connection to control the operation of said registering device.

39. In a weighing mechanism comprising a beam and a poise movable along said beam, means to actuate said poise, a registering device operatively connected with said actuating means, a clutch interposed in said connection to control the operation of said registering device, and manually operable means to actuate said clutch.

40. In a weighing mechanism comprising a plurality of beams and separate poises movable along the respective beams, an adding device operatively connected with the several poises, and means for simultaneously interrupting the several connections.

41. In a weighing mechanism comprising a plurality of beams and separate poises movable along the respective beams, separate actuating devices for the respective poises, an adding device operatively connected with the several actuating devices and adapted to compute the total value as determined by the position of the several poises with relation to the respective beams, and means to simultaneously interrupt the connections between said adding device and the several actuating devices.

42. In a weighing mechanism comprising a plurality of beams and separate poises movable along said respective beams, separate actuating devices for the respective poises, an adding device, means for connecting said adding device with each of said actuating devices, each connecting means comprising a clutch, and a single device for actuating the several clutches.

43. In a weighing mechanism comprising a plurality of beams and separate poises movable along the respective beams, separate actuating devices for the respective poises, an adding device, means for connecting said adding device with each of said actuating devices, each connecting means comprising a clutch, and a manually operable lever operatively connected with the several clutches.

In testimony whereof, I affix my signature hereto.

WILLIAM R. MITTENDORF.